(12) United States Patent
Miyake

(10) Patent No.: US 11,787,470 B2
(45) Date of Patent: Oct. 17, 2023

(54) ELECTRIC POWER STEERING APPARATUS, CONTROL DEVICE, CONTROL METHOD, AND MOTOR MODULE

(71) Applicant: Nidec Corporation, Kyoto (JP)

(72) Inventor: Sohei Miyake, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 216 days.

(21) Appl. No.: 17/458,620

(22) Filed: Aug. 27, 2021

(65) Prior Publication Data

US 2022/0097762 A1 Mar. 31, 2022

(30) Foreign Application Priority Data

Sep. 30, 2020 (JP) ................................. 2020-165575

(51) Int. Cl.
*B62D 6/10* (2006.01)
*B62D 5/04* (2006.01)

(52) U.S. Cl.
CPC ............. *B62D 6/10* (2013.01); *B62D 5/0481* (2013.01)

(58) Field of Classification Search
CPC ................................ B62D 6/10; B62D 5/0481
See application file for complete search history.

(56) References Cited

U.S. PATENT DOCUMENTS 10,843,727 B2    11/2020    Moreillon et al.
2017/0247051 A1   8/2017    Matsuo et al.

FOREIGN PATENT DOCUMENTS

CN    107128355 A    9/2017
JP      3866500 B2    1/2007

OTHER PUBLICATIONS

Official Communication issued in corresponding Chinese Patent Application No. 202110947437.6, dated May 13, 2023.

*Primary Examiner* — Mathew Franklin Gordon
(74) *Attorney, Agent, or Firm* — KEATING & BENNETT

(57) ABSTRACT

A processor calculates a steering wheel torque which an input shaft receives, from a torsion bar torque applied to a torsion bar between the input shaft to which an operation by a driver is input and an output shaft to which a motor applies a drive force, and a rotation angle of the input shaft, compares a calculated steering wheel torque with a threshold value, and determines that a vehicle is in a hands-off state in which the input shaft receives no input based on the operation by the driver when determining that the calculated steering wheel torque changes from a state in which the steering wheel torque exceeds a threshold value to a state in which the steering wheel torque falls below the threshold value.

13 Claims, 10 Drawing Sheets

| 111 | POWER SUPPLY CIRCUIT |
| 112 | ANGLE SENSOR |
| 113 | INPUT CIRCUIT |
| 114 | COMMUNICATION I/F |
| 115 | DRIVE CIRCUIT |
| 116 | MEMORY |
| 200 | PROCESSOR |
| 300 | VEHICLE SPEED SENSOR |
| 541 | TORQUE SENSOR |
| 542 | ROTATION ANGLE SENSOR |

ELECTRIC POWER STEERING APPARATUS, CONTROL DEVICE, CONTROL METHOD, AND MOTOR MODULE

CROSS-REFERENCE TO RELATED APPLICATIONS

The present invention claims priority under 35 U.S.C. § 119 to Japanese Patent Application No. 2020-165575 filed on Sep. 30, 2020, the entire contents of which are hereby incorporated herein by reference.

1. FIELD OF THE INVENTION

The present disclosure relates to an electric power steering apparatus, a control device, a control method, and a motor module.

2. BACKGROUND

A typical automobile is equipped with an electric power steering apparatus (EPS) including an electric motor (hereinafter, simply referred to as a "motor") and a control device to control the motor. The electric power steering apparatus drives the motor to assist a driver's steering wheel operation.

Automobile automatic driving technology has recently been developed. It has been required for automobile automatic driving to switch vehicle control in accordance with whether a vehicle is in an operative state in which a driver operates a steering wheel by hands or a hands-off state in which the driver takes his/her hands off the steering wheel.

There is a control device to control a current to be fed to a motor of an electric power steering apparatus. The control device includes a damper controller configured to calculate a damper current for suppressing abrupt return from a turned position of a steering wheel to a neutral position of the steering wheel. The neutral position of the steering wheel refers to a position of the steering wheel that causes a vehicle to travel straight. The control device also includes a hands-off state determination unit. The hands-off state determination unit makes the control by the damper controller valid or invalid in accordance with a determination as to whether the vehicle is in the hands-off state.

A technique has been required, which reduces a time to be taken until a control device determines that a vehicle is in a hands-off state when a driver takes his/her hands off a steering wheel.

SUMMARY

An example embodiment of the present disclosure provides a control device to control a motor to apply a drive force to a steering system including an input shaft and an output shaft. The control device includes a processor and a storage to store a program to control an operation of the processor. The processor is configured or programmed to calculate a steering wheel torque which the input shaft receives, from a torsion bar torque applied to a torsion bar between the input shaft to which an operation by a driver is input and the output shaft to which the motor applies a drive force, and a rotation angle of the input shaft, compare the calculated steering wheel torque with a threshold value, and determine that a vehicle is in a hands-off state in which the input shaft receives no input based on the operation by the driver when determining that the calculated steering wheel torque changes from a state in which the steering wheel torque exceeds the threshold value to a state in which the steering wheel torque falls below the threshold value.

An example embodiment of the present disclosure also provides a control method to control a motor to apply a drive force to a steering system including an input shaft and an output shaft, the control method including calculating a steering wheel torque which the input shaft receives, from a torsion bar torque applied to a torsion bar between the input shaft to which an operation by a driver is input and the output shaft to which the motor applies a drive force, and a rotation angle of the input shaft, comparing the calculated steering wheel torque with a threshold value, and determining that a vehicle is in a hands-off state in which the input shaft receives no input based on the operation by the driver when determining that the calculated steering wheel torque changes from a state in which the steering wheel torque exceeds the threshold value to a state in which the steering wheel torque falls below the threshold value.

The above and other elements, features, steps, characteristics and advantages of the present disclosure will become more apparent from the following detailed description of the example embodiments with reference to the attached drawings.

DETAILED DESCRIPTION

Figure 1:
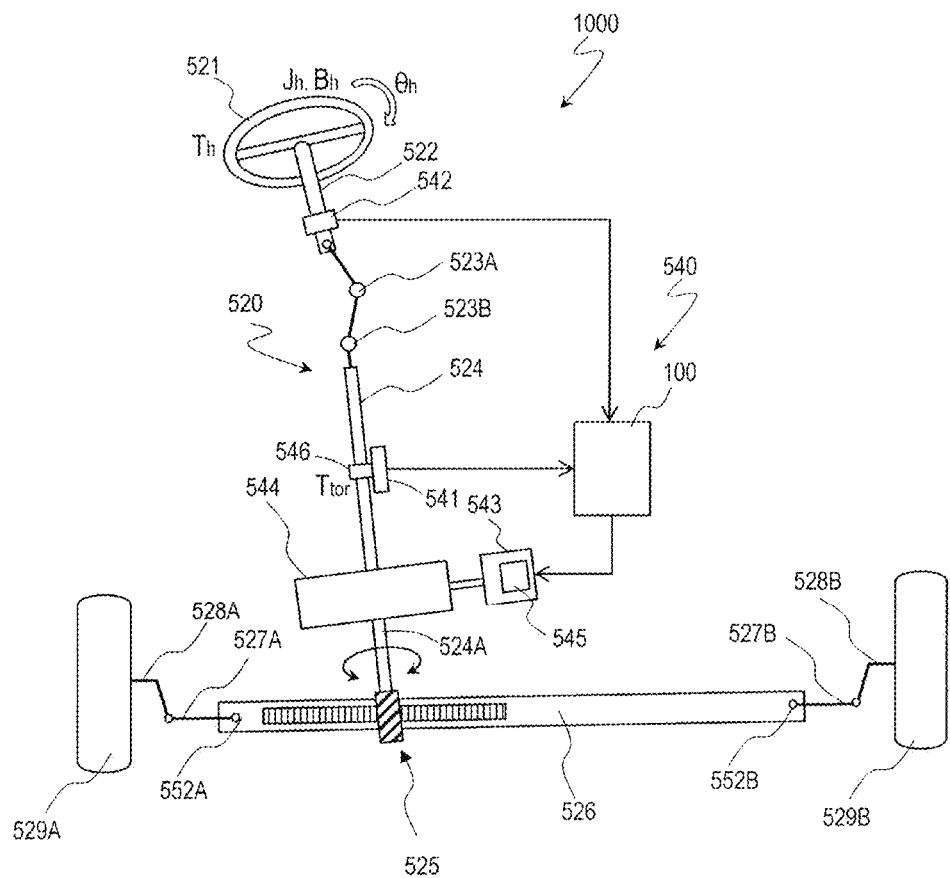
FIG. 1 is a diagram that illustrates an electric power steering apparatus 1000 according to an example embodiment of the present disclosure.

Prior to a description of example embodiments of the present disclosure, a description will be given of findings and discoveries made by the inventors.

In the conventional control device, a torque sensor detects a torsion bar torque applied to a torsion bar. The hands-off state determination unit in the conventional control device determines that the vehicle is in the hands-off state when a torsion bar torque received from the torque sensor takes a value of or approximate to zero, and determines that the vehicle is not in the hands-off state when a condition of torsion bar torque |Th|>X1 (X1: a constant larger than zero) is satisfied, that is, when the torsion bar torque takes a value equal to or more than a constant X1. The torque sensor detects, from the torsion of the torsion bar, a force applied to the torsion bar, that is, a turn of the steering wheel. However, the torsion is applied to the torsion bar with a time lag from the turn of the steering wheel. For this reason, in a case where the hands-off determination unit determines whether the vehicle is in the hands-off state, based on only the torsion bar torque received from the torque sensor, and performs damper control, based on a result of the determination, a time is required until the steering wheel returns from the turned position to the neutral position.

As a result of the studies made intensively, the inventors of this application have focused attention on the fact that a change in steering wheel torque applied to an input shaft of an electric power steering apparatus is smaller in time lag than a change in torsion bar torque applied to a torsion bar. The inventors of this application thus have found that a determination as to whether a vehicle is in a hands-off state is made based on a steering wheel torque acquired using a torsion bar torque and a rotation angle of an input shaft, which leads to a reduction in time to be taken until it is determined that the vehicle is in the hands-off state when a driver takes his/her hands off a steering wheel.

Hereinafter, example embodiments of the present disclosure will be described in detail with reference to the accompanying drawings. However, a specific description more than necessary will not be given in some cases. For example, a specific description on a well-known matter or a duplicate description on a substantially identical configuration will not be given in some cases. This is because of avoiding the following description redundant more than necessary and facilitating the understanding of a person skilled in the art.

Example embodiments to be described below are merely exemplary; therefore, a control device and a control method for an electric power steering apparatus according to the present disclosure are not limited to the following example embodiments. For example, numerical values, processes, an order of the processes, and the like to be described in the following example embodiments are merely exemplary and may be modified variously insofar as there are no technical inconsistencies. The following example embodiments are merely exemplary and may be combined variously insofar as there are no technical consistencies.

FIG. 1 is a diagram that schematically illustrates a configuration example of an electric power steering apparatus 1000 according to the present example embodiment.

The electric power steering apparatus 1000 (hereinafter, simply referred to as an "EPS") includes a steering system 520 and an auxiliary torque mechanism 540 configured to produce an auxiliary torque. The EPS 1000 produces an auxiliary torque for assisting a steering wheel torque produced from the steering system when a driver operates a steering wheel. The auxiliary torque reduces load on the driver's operation.

The steering system 520 includes, for example, a steering wheel 521, a steering shaft 522, universal joints 523A and 523B, a rotating shaft 524, a rack and pinion mechanism 525, a rack shaft 526, left and right ball joints 552A and 552B, tie rods 527A and 527B, knuckles 528A and 528B, and left and right steered wheels 529A and 529B. For example, the steering shaft 522 serves as an input shaft, and a rack shaft 526-side portion of the rotating shaft 524 serves as an output shaft 524A in the steering system 520.

The auxiliary torque mechanism 540 includes, for example, a torque sensor 541, a rotation angle sensor 542, an electronic controller (ECU) 100 for automobiles, a motor 543, a reduction gear 544, an inverter 545, and a torsion bar 546.

The torsion bar 546 is between the input shaft (the steering shaft) 522 that receives a steering wheel operation by the driver and the output shaft 524A to which the motor 543 applies a drive force. The torque sensor 541 detects torsion of the torsion bar 546, thereby detecting a torsion bar torque $T_{tor}$ applied to the torsion bar 546. The rotation angle sensor (a steering angle sensor) 542 detects a rotation angle (a steering wheel angle) $\theta_h$ of the input shaft 522. The rotation angle $\theta_h$ is substantially equal to a rotation angle of the steering wheel 521.

The ECU 100 outputs, to the inverter 545, a motor drive signal which the ECU 100 generates based on a detection signal detected by, for example, the torque sensor 541, the rotation angle sensor 542, or a vehicle speed sensor 300 (FIG. 2) mounted in a vehicle. For example, the inverter 545 supplies, to the motor 543, three-phase AC power having A-phase, B-phase, and C-phase pseudo sine waves into which the inverter 545 converts DC power in accordance with a motor drive signal. The motor 543 is, for example, a surface permanent magnet synchronous motor (SPMSM) or a switched reluctance motor (SRM) that receives the three-phase AC power and produces an auxiliary torque according to a steering wheel torque. The motor 543 transmits the auxiliary torque thus produced to the steering system 520 via the reduction gear 544. Hereinafter, the ECU 100 is described as a control device 100 for the EPS.

The control device 100 and the motor 543 are assembled into a module, and a motor module is manufactured and put on the market. The motor module including the motor 543 and the control device 100 is suitably used for the EPS 1000. The control device 100 may alternatively be manufactured and put on the market as a control device to control the EPS 1000, independently of the motor 543.

Figure 2:
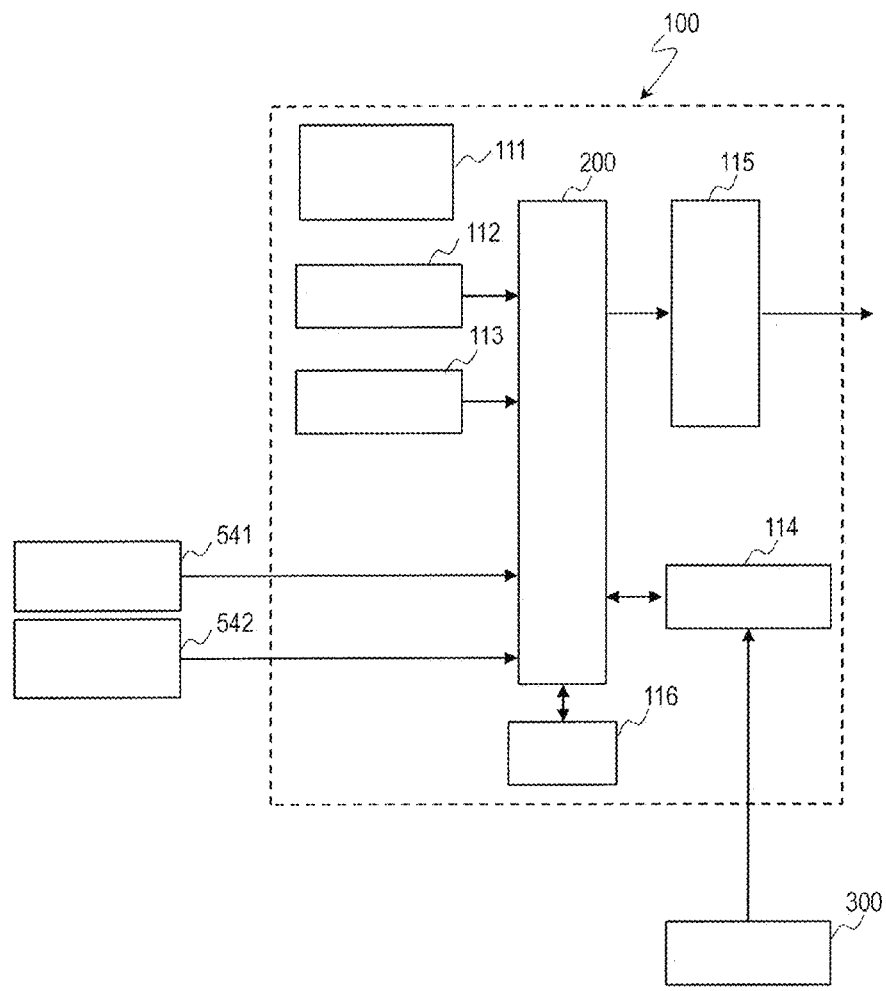
FIG. 2 is a block diagram that illustrates a control device 100 according to an example embodiment of the present disclosure.

FIG. 2 is a block diagram that illustrates a typical example of a configuration of the control device 100 according to the present example embodiment. The control device 100 includes, for example, a power supply circuit 111, an angle sensor 112, an input circuit 113, a communication I/F 114, a drive circuit 115, a memory 116, and a processor 200. The control device 100 may be embodied as a printed circuit board (PCB) including these electronic components.

The torque sensor 541 and the rotation angle sensor 542 are electrically connected to the processor 200. The torque sensor 541 transmits the torsion bar torque $T_{tor}$ to the processor 200. The rotation angle sensor 542 transmits the rotation angle $\theta_h$ to the processor 200. The vehicle speed sensor 300 may be disposed at any position on a power transmission path of the vehicle. The vehicle speed sensor 300 transmits a vehicle speed v to the processor 200 by, for example, CAN communication. In the example illustrated in FIG. 2, the vehicle speed sensor 300 transmits the vehicle speed v to the processor 200 via the communication I/F 114.

The control device 100 is electrically connected to the inverter 545 (FIG. 1). The control device 100 controls switching operations of multiple switching elements (e.g., MOSFETs) of the inverter 545. Specifically, the control device 100 outputs, to the inverter 545, a control signal (hereinafter, referred to as a "gate control signal") for controlling the switching operation of each switching element.

The control device 100 generates a torque command value based on a vehicle speed, a steering wheel torque, and the like, and controls a torque and a rotational speed of the motor 543 by, for example, vector control. The control device 100 may perform any closed loop control in addition to the vector control. The rotational speed is represented by a number of revolutions of a rotor per unit time (e.g., one minute) (rpm) or a number of revolutions of a rotor per unit time (e.g., one second) (rps). The vector control is a method of decomposing a current flowing through the motor into a current component that contributes to torque production and a current component that contributes to magnetic flux generation, and independently controlling the current components that are orthogonal to each other.

The power supply circuit 111 is connected to an external power source (not illustrated) to generate a DC voltage to be supplied to each block in the circuitry. The DC voltage to be generated is, for example, 3 V or 5 V.

The angle sensor 112 is, for example, a resolver or a Hall IC. The angle sensor 112 may alternatively be a combination of a magnetoresistive (MR) sensor including MR elements with a sensor magnet. The angle sensor 112 detects a rotation angle of the rotor in the motor 543, and outputs the rotation angle to the processor 200. The control device 100 may include, in place of the angle sensor 112, a speed sensor configured to detect a rotational speed of the motor or an acceleration sensor configured to detect an acceleration of the motor.

The input circuit 113 receives a motor current value (hereinafter, referred to as an "actual current value") detected by a current sensor (not illustrated), converts a level of the actual current value to an input level of the processor 200 as required, and outputs the actual current value to the processor 200. The input circuit 113 is typically, for example, an analog-to-digital conversion circuit.

The processor 200 is a semiconductor integrated circuit, and is also referred to as a central processing unit (CPU) or a microprocessor. The processor 200 implements desired processes by sequentially executing computer programs that are stored in the memory 116 and describe commands for controlling the driven motor. The processor 200 is broadly interpreted as terminology including a CPU-equipped field programmable gate array (FPGA), application specific integrated circuit (ASIC) or application specific standard product (ASSP). The processor 200 sets a target current value in accordance with, for example, the actual current value and the rotation angle of the rotor to generate a PWM signal, and outputs the PWM signal to the drive circuit 115.

The communication I/F 114 is, for example, an input/output interface for data exchange that conforms to an onboard control area network (CAN).

The drive circuit 115 is typically a gate driver (or a pre-driver). The drive circuit 115 generates a gate control signal in accordance with the PWM signal, and gives the gate control signal to a gate of each switching element in the inverter 545. In a case where a target to be driven is a motor that is driven at low voltage, the gate driver is not necessarily required. In this case, the processor 200 may have the function of the gate driver.

The memory 116 is an example of a storage device, and is electrically connected to the processor 200. The memory 116 is, for example, a writable memory (e.g., a PROM), a rewritable memory (e.g., a flash memory, an EEPROM), or a read-only memory. The memory 116 stores therein a control program including a command set that causes the processor 200 to drive the motor. The memory 116 stores therein a control program including a command set that causes the processor 200 to execute various kinds of computation processing and various kinds of control processing as will be described later. For example, the control program is once developed onto a RAM (not illustrated) at a boot time.

Next, a description will be given of processing that involves acquiring the steering wheel torque $T_h$ using the torsion bar torque $T_{tor}$ and the rotation angle $\theta_h$ of the input shaft 522, and determining whether the vehicle is in the hands-off state, based on the acquired steering wheel torque $T_h$. The steering wheel torque $T_h$ is a torque applied to the steering wheel 521 when the driver turns the steering wheel 521.

Figure 3:
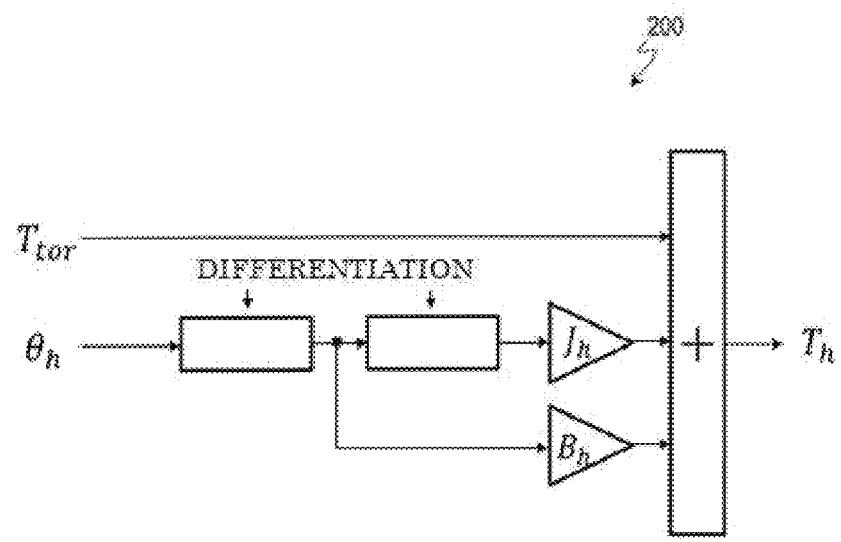
FIG. 3 is a functional block diagram that illustrates, on a functional block basis, functions mounted on a processor 200 according to an example embodiment of the present disclosure, for calculating a steering wheel torque $T_h$ which an input shaft 522 receives.

FIG. 3 is a functional block diagram that illustrates, on a functional block basis, functions mounted on the processor 200, for calculating the steering wheel torque $T_h$ which the input shaft 522 receives.

Typically, the processes (or the tasks) of the functional blocks are described in the computer program on a software module basis, and are stored in the memory 116. However, in a case where an FPGA or the like is used, all or some of the functional blocks may be implemented as hardware accelerators.

In a case where each functional block is mounted as software (or firmware) on the control device 100, the processor 200 may execute the software. According to an example embodiment of the present disclosure, the control device 100 includes the processor 200 and the memory 116 storing the program to control the operation of the processor 200. In accordance with the program, (1) the processor 200 calculates the steering wheel torque $T_h$ which the input shaft 522 receives, from the torsion bar torque $T_{tor}$ applied to the torsion bar 546 and the rotation angle $\theta_h$ of the input shaft 522, (2) the processor 200 compares the calculated steering wheel torque $T_h$ with a threshold value K, and (3) the processor 200 determines that the vehicle is in the hands-off state in which the input shaft 522 receives no input based on the operation by the driver when determining that the calculated steering wheel torque $T_h$ changes from a state in which the steering wheel torque $T_h$ exceeds the threshold value K to a state in which the steering wheel torque $T_h$ falls below the threshold value K.

A relationship among the steering wheel torque $Th_h$, the torsion bar torque $T_{tor}$, and the rotation angle $\theta_h$ is expressed by Equation (1) below, in which $J_h$ represents steering wheel inertia and $B_h$ represents steering wheel viscosity.

[Equation (1)]

$$T_h - T_{tor} = J_h d^2\theta_h/dt^2 + B_h d\theta_h/dt \quad (1)$$

Each of the steering wheel inertia $J_h$ and the steering wheel viscosity $B_h$ is a constant derived from at least one of, for example, a material, a weight, or a length of a component disposed closer to the steering wheel 521 than the torsion bar 546 is.

With reference to FIG. 3, the processor 200 receives the torsion bar torque $T_{tor}$ from the torque sensor 541, and receives the rotation angle $\theta_h$ from the rotation angle sensor 542. The processor 200 multiplies a change in speed of the rotation angle $\theta_h$ and the steering wheel viscosity $B_h$ together. The change in speed of the rotation angle $\theta_h$ is obtained by differentiation of the rotation angle $\theta_h$. The processor 200 also multiplies a change in acceleration of the rotation angle $\theta_h$ and the steering wheel inertia $J_h$ together. The change in acceleration of the rotation angle $\theta_h$ is obtained by second-order differentiation of the rotation angle $\theta_h$. The steering wheel torque $T_h$ is obtained by addition of the results of differentiation and the torsion bar torque $T_{tor}$.

Figure 4:
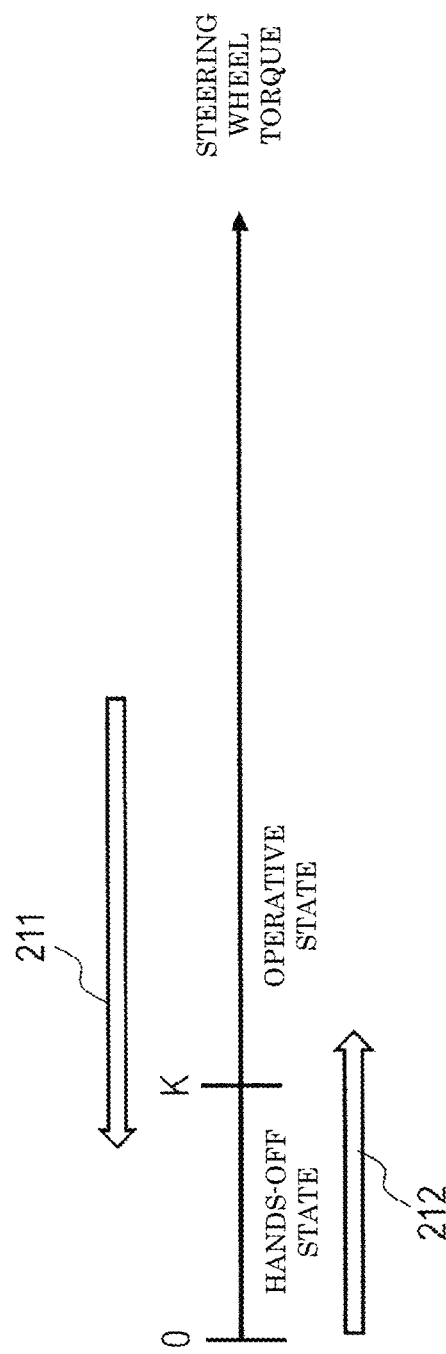
FIG. 4 is a diagram that illustrates processing of determining whether a vehicle is in an operative state or a hands-off state according to an example embodiment of the present disclosure.

FIG. 4 is a diagram that illustrates processing of determining whether the vehicle is in an operative state in which the driver operates the steering wheel 521 by hands or the hands-off state in which the driver takes his/her hands off the steering wheel 521. In FIG. 4, the horizontal axis represents an absolute value of the steering wheel torque $T_h$. In the operative state, the input shaft 522 receives an input based on the operation by the driver. In the hands-off state, the input shaft 522 receives no input based on the operation by the driver.

The processor 200 compares the calculated steering wheel torque $T_h$ with the threshold value K. The processor 200 determines that the vehicle changes from the operative state to the hands-off state when determining that the steering wheel torque $T_h$ changes from a state in which the steering wheel torque $T_h$ exceeds the threshold value K to a state in which the steering wheel torque $T_h$ falls below the threshold value K as indicated by an arrow 211 in FIG. 4. The processor 200 determines that the vehicle changes from the hands-off state to the operative state when determining that the calculated steering wheel torque $T_h$ changes from the state in which the steering wheel torque $T_h$ falls below the threshold value K to the state in which the steering wheel torque $T_h$ exceeds the threshold value K as indicated by an arrow 212 in FIG. 4.

A change in steering wheel torque $T_h$ applied to the input shaft 522 is smaller in time lag than a change in torsion bar torque $T_{tor}$ applied to the torsion bar 546. Therefore, a determination as to the hands-off state based on the steering wheel torque $T_h$ acquired using the torsion bar torque $T_{tor}$ and the rotation angle $\theta_h$ enables a reduction in time to be taken until it is determined that the vehicle is in the hands-off state when the driver takes his/her hands off the steering wheel 521, as compared with a determination as to the hands-off state based on only the torsion bar torque $T_{tor}$. This determination also enables a reduction in time to be taken until it is determined that the vehicle changes from the hands-off state to the operative state.

The processor 200 calculates the steering wheel torque $T_h$ from a combination of the torsion bar torque $T_{tor}$ with the change in speed of the rotation angle $\theta_h$ and the change in acceleration of the rotation angle $\theta_h$. The simple calculation using the changes in speed and acceleration of the rotation angle $\theta_h$ enables quick detection of the change in the steering wheel torque $T_h$. The calculation of the steering wheel torque $T_h$ using only parameters calculated from the torsion bar torque $T_{tor}$ and rotation angle $\theta_h$ enables quick detection of the change in the steering wheel torque $T_h$.

Figure 5:
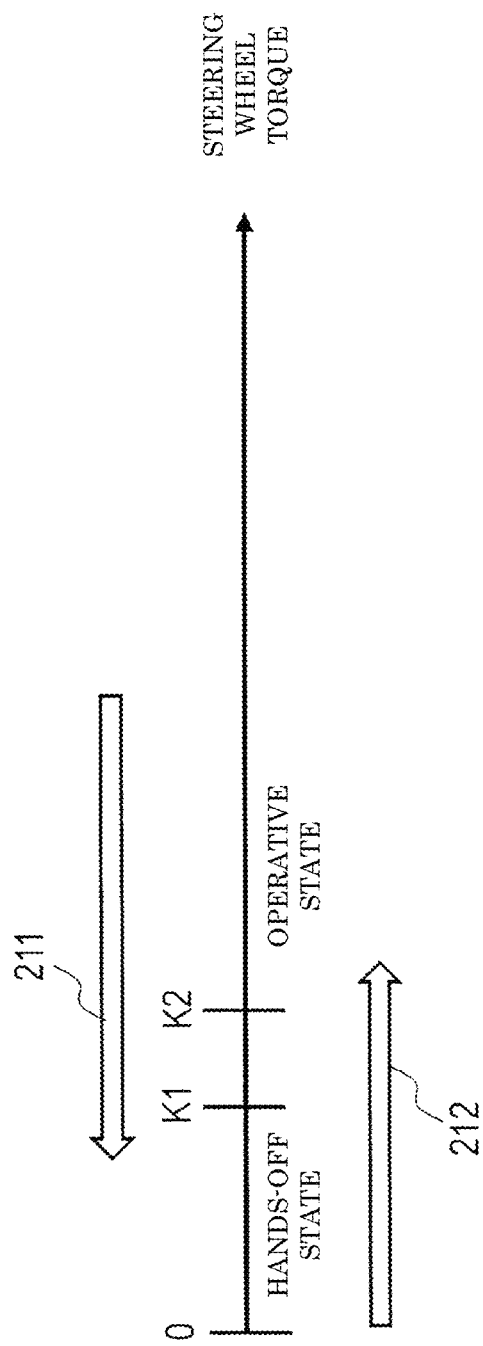
FIG. 5 is a diagram that illustrates another processing of determining whether the vehicle is in the operative state or the hands-off state according to an example embodiment of the present disclosure.

It should be noted that a threshold value for use in the determination as to the change from the operative state to the hands-off state may be different from a threshold value for use in the determination as to the change from the hands-off state to the operative state. FIG. 5 is a diagram that illustrates another processing of determining whether the vehicle is in the operative state or the hands-off state. In FIG. 5, the horizontal axis represents an absolute value of the steering wheel torque $T_h$.

In the example of FIG. 5, when the vehicle is in the operative state, the processor 200 compares the calculated steering wheel torque $T_h$ with a threshold value K1. The processor 200 determines that the vehicle changes from the operative state to the hands-off state when determining that the steering wheel torque $T_h$ changes from a state in which the steering wheel torque $T_h$ exceeds the threshold value K1 to a state in which the steering wheel torque $T_h$ falls below the threshold value K1 as indicated by an arrow 211 in FIG. 5.

On the other hand, when the vehicle is in the hands-off state, the processor 200 compares the calculated steering wheel torque $T_h$ with a threshold value K2. The threshold value K2 is larger than the threshold value K1. The processor 200 determines that the vehicle changes from the hands-off state to the operative state when determining that the calculated steering wheel torque $T_h$ changes from the state in which the steering wheel torque $T_h$ falls below the threshold value K2 to the state in which the steering wheel torque $T_h$ exceeds the threshold value K2 as indicated by an arrow 212 in FIG. 5.

In the example of FIG. 5, the first threshold value K1 is set to be smaller than the second threshold value K2. This suppresses an erroneous determination owing to a disturbance such as vibrations.

When the driver operates the steering wheel 521, the processor 200 causes the motor 543 to perform return drive for applying a drive force such that the input shaft 522 returns to a neutral position and damper drive for suppressing abrupt return of the input shaft 522 to the neutral position. The neutral position as used herein refers to a position of the steering wheel 521 that causes the vehicle to travel straight.

When the driver operates the steering wheel to rotate the input shaft 522, the processor 200 calculates a return torque (an active return torque) that causes the motor 543 to perform the return drive. The processor 200 calculates a damper drive torque that causes the motor 543 to perform the damper drive when determining that the vehicle is in the hands-off state. The processor 200 also calculates a return torque.

The processor 200 generates a PWM signal for driving the motor 543, using the return torque and the damper drive torque. The drive circuit 115 drives the motor 543 in accordance with the PWM signal. This configuration enables the return of the input shaft 522 to the neutral position while suppressing the abrupt return of the input shaft 522 to the neutral position.

Figure 6:
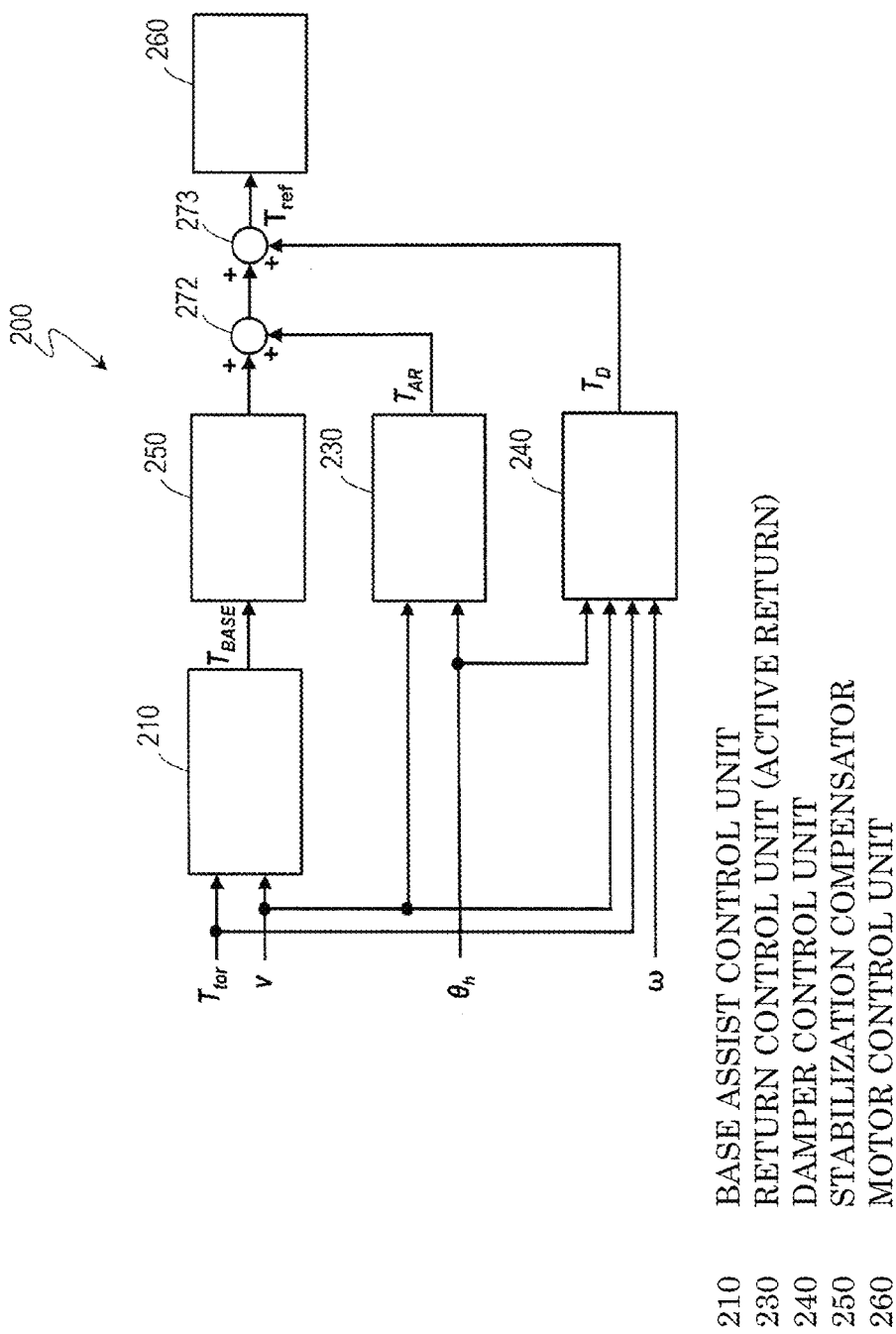
FIG. 6 is a functional block diagram that illustrates, on a functional block basis, functions mounted on the processor 200 according to an example embodiment of the present disclosure.

FIG. 6 is a functional block diagram that illustrates, on a functional block basis, functions mounted on the processor 200. In the example of FIG. 6, the processor 200 includes a base assist controller 210, a return controller 230, a damper controller 240, a stabilization compensator 250, a motor controller 260, an adder 272, and an adder 273. Typically, the processes (or the tasks) of the functional blocks corresponding to the respective units are described in the computer program on a software module basis, and are stored in the memory 116. However, in a case where an FPGA or the like is used, all or some of the functional blocks may be implemented as hardware accelerators.

The processor 200 acquires, as inputs, the torsion bar torque $T_{tor}$ detected by the torque sensor 541, the vehicle speed v detected by the vehicle speed sensor 300, the rotation angle $\theta_h$ detected by the rotation angle sensor 542, and the rotational speed $\omega$ of the input shaft 522. The rotational speed $\omega$ is substantially equal to the rotational speed (the steering wheel speed) of the steering wheel 521. For example, in a case where the EPS 1000 includes a speed sensor configured to detect a rotational speed of the input shaft 522, the processor 200 is capable of acquiring the rotational speed $\omega$ from an output signal from the speed sensor. In addition, the processor 200 may acquire the rotational speed $\omega$ by calculating an angular velocity from an output signal from the rotation angle sensor 542 for detecting the rotation angle $\theta_h$ of the input shaft 522.

The base assist controller 210 acquires the torsion bar torque $T_{tor}$ and the vehicle speed v as inputs, and generates and outputs a base assist torque $T_{BASE}$ based on the signals. The base assist controller 210 is typically a table (e.g., a look-up table) that defines a correspondence between each of the torsion bar torque $T_{tor}$ and the vehicle speed v and the base assist torque $T_{BASE}$. The base assist controller 210 determines the base assist torque $T_{BASE}$, based on the torsion bar torque $T_{tor}$ and the vehicle speed v.

Figure 7:
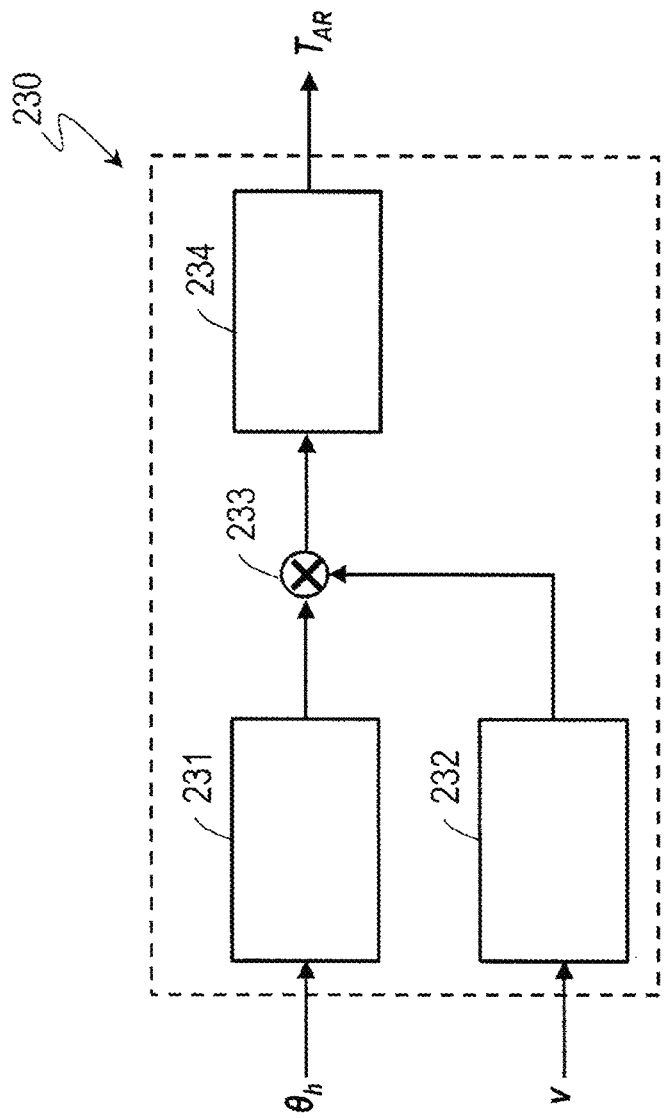
FIG. 7 is a functional block diagram that illustrates functions of a return controller 230 according to an example embodiment of the present disclosure.

FIG. 7 is a functional block diagram that illustrates the functions of the return controller 230. The return controller 230 acquires the vehicle speed v and the rotation angle $\theta_h$ as inputs, and generates an active return torque $T_{AR}$ based on the vehicle speed v and the rotation angle $\theta_h$. The return controller 230 includes a return torque calculation unit 231, a vehicle speed gain correction unit 232, a multiplier 233, and a phase compensator 234. The return torque calculation unit 231 is a table that defines a correspondence between the rotation angle $\theta_h$ and the active return torque (the return torque). The return torque calculation unit 231 determines an active return torque according to the rotation angle $\theta_h$. The vehicle speed gain correction unit 232 is a table that defines a correspondence between the vehicle speed v and a gain $g_a$ relative to the active return torque. The vehicle speed gain correction unit 232 determines the gain $g_a$ according to the vehicle speed v. The multiplier 233 multiplies the active return torque determined by the return torque calculation unit 231 and the gain $g_a$ determined by the vehicle speed gain correction unit 232, together. The phase compensator 234 generates the active return torque $T_{AR}$ by applying a phase lag compensation or a phase lead compensation to a result of the multiplication by the multiplier 233.

Figure 8:
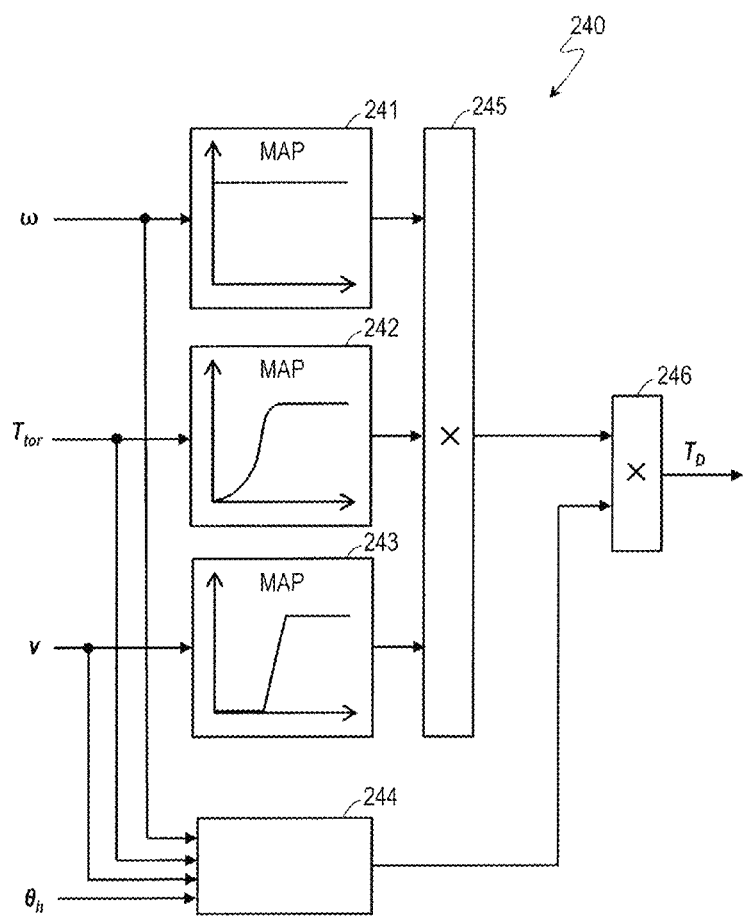
FIG. 8 is a functional block diagram that illustrates functions of a damper controller 240 according to an example embodiment of the present disclosure.

FIG. 8 is a functional block diagram that illustrates functions of the damper controller 240. The damper controller 240 acquires the rotational speed $\omega$, the torsion bar torque $T_{tor}$, the vehicle speed v, and the rotation angle $\theta_h$ as inputs, and generates the damper drive torque $T_D$ based on the rotational speed $\omega$, the torsion bar torque $T_{tor}$, the vehicle speed v, and the rotation angle $\theta_h$. The damper controller 240 includes a map 241, a map 242, a map 243, a forward and return determination unit 244, a multiplier 245, and a multiplier 246.

The map 241 defines a correspondence between the rotational speed $\omega$ and the torque, and determines the torque according to the rotational speed $\omega$. The map 242 defines a correspondence between the torsion bar torque $T_{tor}$ and the torque, and determines the torque according to the torsion bar torque $T_{tor}$. The map 243 defines a correspondence between the vehicle speed v and the torque, and determines the torque according to the vehicle speed v. The multiplier 245 multiplies output signals from the maps 241, 242, and 243 together to output a multiplication value.

The forward and return determination unit 244 receives the rotational speed $\omega$, the torsion bar torque $T_{tor}$, the vehicle speed v, and the rotation angle $\theta_h$. The forward and return determination unit 244 calculates a forward and return ratio that represents a digitized steering state such as whether an absolute value of a steering wheel angle increases or decreases, based on the inputs. The multiplier 246 multiplies an output from the multiplier 245 and the forward and return ratio together to generate the damper drive torque $T_D$.

With reference to FIG. 6, the stabilization compensator 250 applies the phase lag compensation or the phase lead compensation to the base assist torque $T_{BASE}$, thereby generating a stabilization compensation torque. The adder 272 adds the active return torque $T_{AR}$ output from the return controller 230 to the stabilization compensation torque output from the stabilization compensator 250. The adder 273 adds the damper drive torque $T_D$ output from the damper controller 240 to the addition value of the adder 272 to generate the torque command value $T_{ref}$ for controlling the driven motor. The stabilization compensator 250 may receive one of or both the output from the adder 272 and the output from the adder 273, as in the output from the adder 271.

The motor controller 260 is referred to as a current controller in some cases. The motor controller 260 generates a current command value based on the torque command value $T_{ref}$, generates a PWM signal based on the current command value in accordance with, for example, vector control, and outputs the current command value and the PWM signal to the drive circuit 115.

Figure 9:
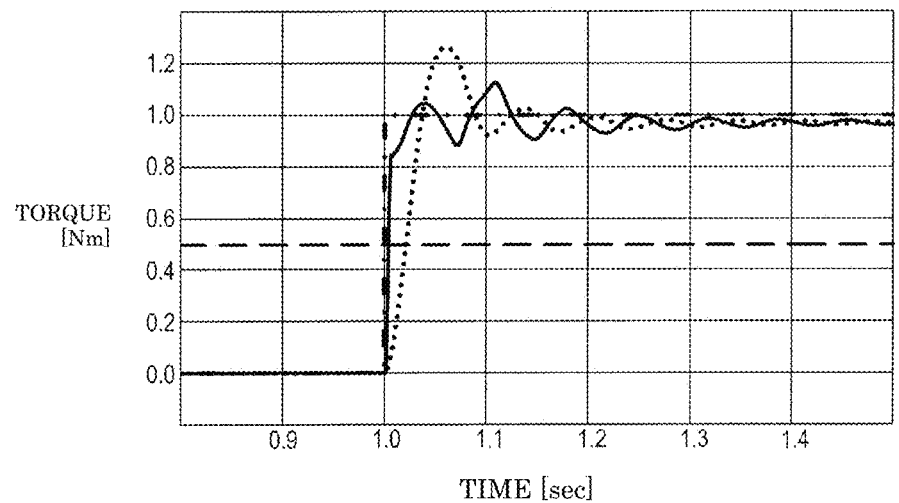
FIG. 9 is a diagram that illustrates a result of simulation on processing of detecting a change between the hands-off state and the operative state according to an example embodiment of the present disclosure.
Figure 10:
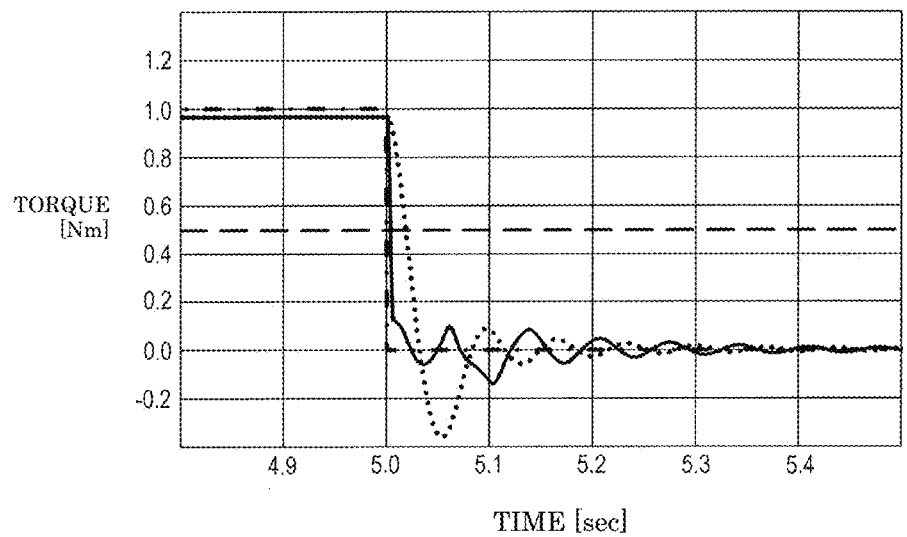
FIG. 10 is a diagram that illustrates a result of simulation on the processing of detecting the change between the hands-off state and the operative state according to an example embodiment of the present disclosure.

FIGS. 9 and 10 are diagrams that illustrate a result of simulation on the processing of detecting the change between the hands-off state and the operative state. In FIGS. 9 and 10, the vertical axis represents a torque, and the horizontal axis represents a time. In FIGS. 9 and 10, a broken line indicates a threshold value K. Also in FIGS. 9 and 10, a chain line indicates a steering wheel torque to be applied to the steering wheel 521 when the driver turns the steering wheel 521. Also in FIGS. 9 and 10, a dotted line indicates a torsion bar torque $T_{tor}$. Also in FIGS. 9 and 10, a solid line indicates the steering wheel torque $T_h$ calculated as described above.

FIGS. 9 and 10 each illustrate a result of simulation in a case where a certain steering wheel torque is applied to the steering wheel 521 from 1.0 second to 5.0 seconds, and then the steering wheel torque applied to the steering wheel 521 is set at zero.

With reference to FIG. 9, it takes 20 ms for the torsion bar torque $T_{tor}$ to exceed the threshold value K after the steering wheel torque is applied to the steering wheel 521; however, it takes 4 ms for the calculated steering wheel torque $T_h$ to exceed the threshold value K. With reference to FIG. 10, it takes 18 ms for the torsion bar torque $T_{tor}$ to fall below the threshold value K after the steering wheel torque applied to the steering wheel 521 is set at zero; however, it takes 3 ms for the calculated steering wheel torque $T_h$ to fall below the threshold value K. The use of the steering wheel torque $T_h$ calculated in accordance with the present example embodiment enables quick detection of a change between the hands-off state and the operative state.

Figure 11:
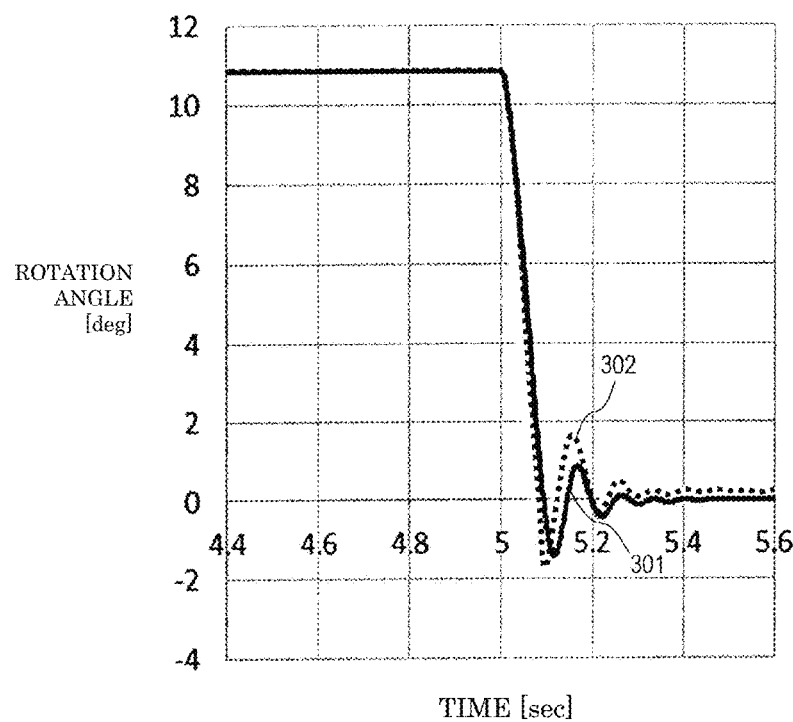
FIG. 11 is a diagram that illustrates a result of simulation on a return characteristic of a steering wheel 521 according to an example embodiment of the present disclosure.

FIG. 11 is a diagram that illustrates a result of simulation on a return characteristic of the steering wheel 521. In FIG. 11, the vertical axis represents a rotation angle, and the horizontal axis represents a time.

In FIG. 11, a solid line 301 indicates a return characteristic of the steering wheel 521 in a case where the hands-off state is determined using the steering wheel torque $T_h$ calculated in accordance with the present example embodiment. Also in FIG. 11, a dotted line 302 indicates a return characteristic of the steering wheel 521 in a case where the hands-off state is determined using only the torsion bar torque $T_{tor}$. It is found that the use of the steering wheel torque $T_h$ calculated in accordance with the present example embodiment improves overshoot of the steering wheel 521 since the damper control is quickly operated (i.e., the brake is applied).

The present example embodiment enables quick detection of a change between the hands-off state and the operative state. This configuration enables quick switch from manual driving to automatic driving and quick switch from automatic driving to manual driving.

Example embodiments of the present disclosure may be applicable to, for example, a control device to control an electric power steering apparatus mounted in a vehicle.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A control device to control a motor to apply a drive force to a steering system including an input shaft and an output shaft, the control device comprising:
   a processor; and
   a storage to store a program to control an operation of the processor; wherein
   the processor is configured or programmed to:
      calculate a steering wheel torque which the input shaft receives, from a torsion bar torque applied to a torsion bar between the input shaft to which an operation by a driver is input and the output shaft to which the motor applies a drive force, and a rotation angle of the input shaft;
      compare the calculated steering wheel torque with a threshold value; and
      determine that a vehicle is in a hands-off state in which the input shaft receives no input based on the operation by the driver when determining that the calculated steering wheel torque changes from a state in which the steering wheel torque exceeds the threshold value to a state in which the steering wheel torque falls below the threshold value.

2. The control device according to claim 1, wherein the processor is configured or programmed to calculate the steering wheel torque from a combination of the torsion bar torque with a change in acceleration of the rotation angle.

3. The control device according to claim 1, wherein the processor is configured or programmed to calculate the steering wheel torque from a combination of the torsion bar torque with a change in speed of the rotation angle.

4. The control device according to claim 1, wherein the processor is configured or programmed to calculate the steering wheel torque from parameters calculated from the torsion bar torque and rotation angle.

5. The control device according to claim 4, wherein the processor is configured or programmed to calculate the steering wheel torque from an equation:

(steering wheel torque)=(torsion bar torque)+$J_h$·
(change in acceleration of rotation angle)+$B_h$·
(change in speed of rotation angle), where $J_h$ and $B_h$ each represent a constant derived from at least one of a material, a weight, or a length of a component that is closer to a steering wheel than the torsion bar is.

6. The control device according to claim 1, wherein the processor is configured or programmed to determine that the vehicle is in an operative state in which the input shaft receives an input based on the operation by the driver upon determining that the calculated steering wheel torque changes from the state in which the steering wheel torque falls below the threshold value to the state in which the steering wheel torque exceeds the threshold value.

7. The control device according to claim 6, wherein
   the threshold value includes:
      a first threshold value to determine a change from the operative state to the hands-off state; and
      a second threshold value to determine a change from the hands-off state to the operative state; and
   the first threshold value is smaller than the second threshold value.

8. The control device according to claim 1, wherein
   when the steering wheel is operated, the motor is capable of performing return drive to apply a drive force such that the input shaft returns to a neutral position and damper drive to suppress abrupt return of the input shaft to the neutral position; and
   the processor is configured or programmed to calculate a damper drive torque that causes the motor to perform the damper drive when determining that the vehicle is in the hands-off state.

9. The control device according to claim 8, wherein
   the processor is configured or programmed to calculate a return torque that causes the motor to perform the return drive;
   the processor is configured or programmed to calculate a torque command value from the damper drive torque and the return torque; and
   the processor is configured or programmed to control the motor, based on the torque command value.

10. The control device according to claim 8, wherein
    the processor is configured or programmed to calculate a return torque that causes the motor to perform the return drive when the driver operates the steering wheel to rotate the input shaft; and
    the processor is configured or programmed to calculate the damper drive torque in addition to the return torque when determining that the vehicle is in the hands-off state.

11. A motor module comprising:
    a motor; and
    the control device according to claim 1.

12. An electric power steering apparatus comprising:
    the motor module according to claim 11;
    a torque sensor to detect the torsion bar torque; and
    an angle sensor to detect the rotation angle.

13. A control method to control a motor to apply a drive force to a steering system including an input shaft and an output shaft, the control method comprising:
    calculating a steering wheel torque which the input shaft receives, from a torsion bar torque applied to a torsion bar between the input shaft to which an operation by a driver is input and the output shaft to which the motor applies a drive force, and a rotation angle of the input shaft;
    comparing the calculated steering wheel torque with a threshold value; and determining that a vehicle is in a hands-off state in which the input shaft receives no input based on the operation by the driver when determining that the calculated steering wheel torque changes from a state in which the steering wheel torque exceeds the threshold value to a state in which the steering wheel torque falls below the threshold value.

* * * * *